(12) United States Patent
Spitzer et al.

(10) Patent No.: US 6,460,950 B2
(45) Date of Patent: Oct. 8, 2002

(54) MODULAR CONTAINER/BOOKSHELF MOVING CART

(76) Inventors: Christopher G. Spitzer, 5 Firehorn Dr., Milford, NJ (US) 08848; Richard F. Spitzer, 26 Conkling Rd., Flanders, NJ (US) 07836

( * ) Notice: Subject to any disclaimer, the term of this patent is extended or adjusted under 35 U.S.C. 154(b) by 0 days.

(21) Appl. No.: 09/912,085

(22) Filed: Jul. 24, 2001

(65) Prior Publication Data

US 2001/0050517 A1 Dec. 13, 2001

Related U.S. Application Data

(63) Continuation-in-part of application No. 09/525,417, filed on Mar. 15, 2000, now Pat. No. 6,247,769.

(51) Int. Cl.[7] ............................................... A47B 47/00
(52) U.S. Cl. .................... 312/249.8; 312/201; 312/240; 280/79.11
(58) Field of Search ............................ 312/249.1, 249.8, 312/198, 199, 200, 201, 107, 108, 240, 283, 286, 257.1, 351; 280/79.11, 47.18, 47.34, 47.35

(56) References Cited

U.S. PATENT DOCUMENTS

| | | | |
|---|---|---|---|
| 1,779,218 A | * 10/1930 | Schmalzgruber | ........ 312/199 X |
| 1,858,086 A | * 5/1932 | House | .................... 312/201 X |
| 2,555,178 A | 5/1951 | Young | |
| 2,652,308 A | * 9/1953 | Peterson | .................. 280/79.11 |
| 3,148,923 A | * 9/1964 | Smith | .......................... 312/201 |
| 3,905,662 A | 9/1975 | Richmond | |
| 4,102,275 A | 7/1978 | Spound et al. | |
| 4,709,971 A | 12/1987 | Leeds et al. | |
| 5,566,961 A | * 10/1996 | Snell et al. | ............... 280/47.35 |
| 5,683,155 A | * 11/1997 | Sarno | .......................... 312/201 |
| 5,749,636 A | 5/1998 | Boury | |

FOREIGN PATENT DOCUMENTS

| FR | 874904 | * 8/1942 | ................. 312/201 |
|---|---|---|---|

* cited by examiner

*Primary Examiner*—James O. Hansen
(74) *Attorney, Agent, or Firm*—Kenneth P. Glynn. Esq.

(57) ABSTRACT

The modular moving carts include removable, attachable shelf storage units which are useful in two, three or four different positions. By changing the relative positions of the units, i.e., standing and facing one direction, they form bookcases/storage areas having a depth to accommodate books, or to form deep shelves to accommodate computers, typewriters, etc., and in a position lying down, to form a container or bin. The cart includes a rectangular base member having four outer edges adapted to support and retain two or more shelf storage units and has a predetermined width, a predetermined length and a predetermined area (based on the width multiplied by the length), with a plurality of wheels attached thereto. There is also at least one first type of shelf storage unit and at least one second type of shelf storage unit included in the present invention. The first shelf storage unit has a top, a bottom, and two opposing vertical side walls situated perpendicularly to the top and bottom, and an open front and an open back. The first shelf storage unit is removably attachable to the rectangular base member. The second shelf storage unit has a top, a bottom, two opposing vertical side walls, a back wall and an open front, and is removably attachable to the rectangular base member. The second shelf storage unit has a first vertical placement position and a second vertical placement position, and at least one horizontal placement position.

20 Claims, 3 Drawing Sheets

MODULAR CONTAINER/BOOKSHELF MOVING CART

REFERENCES TO RELATED APPLICATIONS

This patent application is a continuation-in-part of U.S. patent application Ser. No 09/525,417, filed on Mar. 15, 2000 by the same inventors herein, and entitled "MODULAR BOOK/COMPUTER SHELF MOVING CART" now U.S. Pat. No. 6,247,769.

BACKGROUND OF THE INVENTION

1. Field of the Invention

The present invention is directed to modular moving carts, and, more particularly, to such carts which include removable, attachable shelf storage units which are useful in two, and for some units, three different positions. With the unique capability of rotating or changing the relative positions of the units, i.e., standing and facing one direction, standing and facing another direction, or lying down, the units operate together to form bookshelves having a depth to accommodate books, or to form deep shelves to accommodate computers, typewriters, printers, TVs, lab equipment, medical equipment and the like, and in a third position lying down, to form a container or bin.

2. Information Disclosure Statement

Conventional shelving units are typically one piece or multi piece units which are constructed so as to fixedly store shelves at pre-selected intervals but which at the same time so not permit the simple conversion of the unit so as to increase or decrease the horizontal storage depth of the same. The following patents are representative of the state of the art of shelves and moving carts.

U.S. Pat. No. 2,555,178 to P. O. Young describes a collapsible maid service truck of the character described which comprises a body frame having a plurality of fixed shelves; a pair of wheels mounted on the lower rear edge of said frame; a pair of swivel casters mounted on the front of said frame; a folding shelf assembly removably supported on the front of said frame; a folding frame hingedly fastened to the upper rear edge of said frame, and an articulated tail hinged to the lower rear edge of the frame.

U.S. Pat. No. 3,905,662 to J. W. Richmond describes a combined cabinet and table having two hingedly connected halves, each comprising a top wall, a bottom wall, a rear wall, a side wall and a front wall, said cabinet halves opening toward each other when the cabinet is closed. Horizontally disposed shelves are mounted within the cabinet halves for movement toward and away from the side walls thereof when the cabinet is open and said side walls are substantially coplanar. The shelves are removable from the cabinets and the two halves are provided with latches for holding them in the open or closed positions. The two halves are mounted upon wheels and all corners of said cabinet are rounded.

U.S. Pat. No. 4,102,275 to A. M. Spund et. al. describes a modular shelf unit capable of assuming a variety of horizontal widths and angular configurations. The aesthetically pleasing shelf unit is formed from two independent upstanding side supports each having a plurality of cantilevered shelves extending therefrom and cooperative with one another to provide an interdigitated, self-supporting shelf unit that is both expandable in the horizontal direction and rotatable about an axis common to each independent side support. The resulting shelf unit is an adjustable, self-supporting structure which is readily adaptable for use in available spaces in homes. and offices.

U.S. Pat. No. 4,709,971 to R. Leeds et. al. describes a computer work station for use with a computer system which includes two sections, a front section and a rear section, pivotally connected about an exterior pivot axis. The rear section includes shelves for supporting some components of the computer system, such as the CPU, display monitor, keyboard and modem. A keyboard shelf is slidably disposed within the rear section, while other shelves are fixedly mounted therewithin. A common power strip is disposed between two of the shelves of the rear section for providing a single connection of at least some of the components of the computer system to an exterior power source. The front section includes a front panel which extends substantially the entire height of the computer work station, and includes a cork strip for posting memoranda and the like thereon. The front section farther includes shelves for supporting other components of the computer system, such as a printer and its associated bow of paper. None of the shelves extend the complete depth of the computer work station, so that cords used to connect various components of the computer system may be conventionally placed therebehind. The computer work station also includes fasteners for supporting such cords between the front and rear sections. The front and rear sections are shaped complimentary with respect to each other, so that, when the computer work station is in a closed position, the two sections together form a substantially enclosed object.

U.S. Pat. No. 5,749,636 to N. Boury describes a storage for retaining CD cassettes or the like which includes at least two opposed towers that are hingedly connected along the adjacent upright peripheral segments of the towers. The towers include a plurality of aligned ribbed portions that retain the cassettes when the towers are moved to a first locked position. The storage rack permits ready hand access to the cassette when moved to a second unlocked position.

Notwithstanding the prior art, the present invention is neither taught nor rendered obvious thereby.

SUMMARY OF THE INVENTION

The present invention involves modular moving carts which are useful in the moving industry, for warehousing for computer and book movement as in computer assemblage, manufacturing and sales, and similarly in the book industry as well as for other applications which require versatility in moving devices. It is particularly useful in moving offices from one location to another. The present invention carts include removable, attachable shelf storage units which are useful in two, three or four different positions. With the unique capability of rotating or changing the relative positions of the units, i.e., standing and facing one direction, standing and facing another direction, or lying down, the units operate together to form bookshelves having a depth to accommodate books, or to form deep shelves to accommodate computers, typewriters, printers, TVs, lab equipment, medical equipment and the like, and in a position lying down, to form a container or bin.

The present invention modular container/bookshelf moving cart includes a rectangular base member having four outer edges adapted to support and retain two or more shelf storage units. The rectangular base member has a predetermined width, a predetermined length and a predetermined area (based on the width multiplied by the length), with a plurality of wheels attached thereto for movement of the rectangular base member. Typically, four dolly type wheels are used, but more or fewer may be employed, and of different types of wheels, without exceeding the scope of the present invention.

In addition to the aforesaid base member, there is also at least one first type of shelf storage unit and at least one second type of shelf storage unit included in the present invention.

The first shelf storage unit has a top, a bottom, and two opposing vertical side walls situated perpendicularly to the top and bottom, and an open front and an open back. The first shelf storage unit is removably attachable to the rectangular base member. When it is in a first position, being a vertical placement position, it extends vertically from the rectangular base member with the top facing upwardly away from the rectangular base member, and when in a second position, being a horizontal position, it extends horizontally relative to the rectangular base member with the top being vertically positioned.

The second shelf storage unit has a top, a bottom, two opposing vertical side walls, a back wall and an open front, and is removably attachable to the rectangular base member. The second shelf storage unit has a first vertical placement position and a second vertical placement position, and at least one horizontal placement position. When in its first vertical placement position, it extends vertically from the rectangular base member with the back wall being positioned away from the outer edges, and, when in its second vertical placement position, it extends vertically from the rectangular base member with the back wall being positioned adjacent one of the outer edges. When in its at least one horizontal placement position, it extends horizontally relative to the rectangular base member and positionable below the first shelf storage unit in its horizontal placement position.

Thus, when the second shelf storage unit is in its first vertical placement position, the back wall is inwardly displaced upon the base adjoining the first shelf storage unit thereby establishing an interior dividing wall and establishing a dual open sided modular moving cart, and, when the second shelf storage unit is in its second vertical placement position, the back wall is located proximate to at least one outer edge of the rectangular base member, thereby establishing a rear wall and further establishing a single open sided, deep modular moving cart, and, when the second shelf storage unit is in its horizontal placement position, the back wall is horizontally nesting on the rectangular base member, and, with or without the first shelf storage unit, further establishing a container.

Both the first and the second shelf storage units also contain at least one set of shelf-retaining members located therein for retaining at least one removable shelf in a preselected position therein.

In some preferred embodiments, the present invention modular container/bookshelf moving cart side walls of the first shelf storage unit and/or the second shelf storage unit have a predetermined weight approximately equal to 1/n times at least one of the predetermined width and the predetermined length of the rectangular base member, wherein n is an integer from one to six, so as to accommodate sideways nesting of n number of shelf storage units on the rectangular base member. In those embodiments wherein there is one first shelf storage unit and one second shelf storage unit, the second shelf storage unit may be placed in its first vertical placement position, so that the vertically extended back side wall is centrally displaced upon the base adjoining the first shelf storage unit, thereby establishing a central dividing wall and establishing a dual open sided modular moving cart, and when the second shelf storage unit is in its second vertical placement position, the vertically extended back side wall is located proximate to one of the outer edges of the rectangular base member, thereby establishing a rear wall and further establishing a single open sided modular moving cart. When the second shelf storage unit is in its first vertical or its second vertical placement position, first and second shelf storage units may each contain at least one separate shelf therein, horizontally displaced and positioned as a user may desire. When the second shelf is in its second vertical position, these shelves should be aligned with one another to create an extended shelf.

In some preferred embodiments. The modular container/bookshelf moving cart according to the present invention may further include at least one removable vertical dividing wall to accommodate quick conversion from a closed to an open shelf area to increase or decease shelf size, and/or to be used as a front protective wall. Also, the present invention cart may further include cover means for securing cargo within the modular container/bookshelf moving cart. Also, one or more of the shelf storage units may include at least one handle to accommodate easier lifting and positioning.

In some embodiments, of the present invention modular container/bookshelf moving cart at least one of the first and said second shelf storage units includes a hinged top to create additional access. Additionally, the modular container/bookshelf moving cart may have a rectangular base member, which includes means defined therein for storing shelving.

It is preferred that the modular container/bookshelf moving cart rectangular base member outer edges be upwardly projecting edges adapted to prevent movement of the shelf storage units positioned thereon. It may also include linking means for linking a plurality of modular shelf moving carts with one another.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
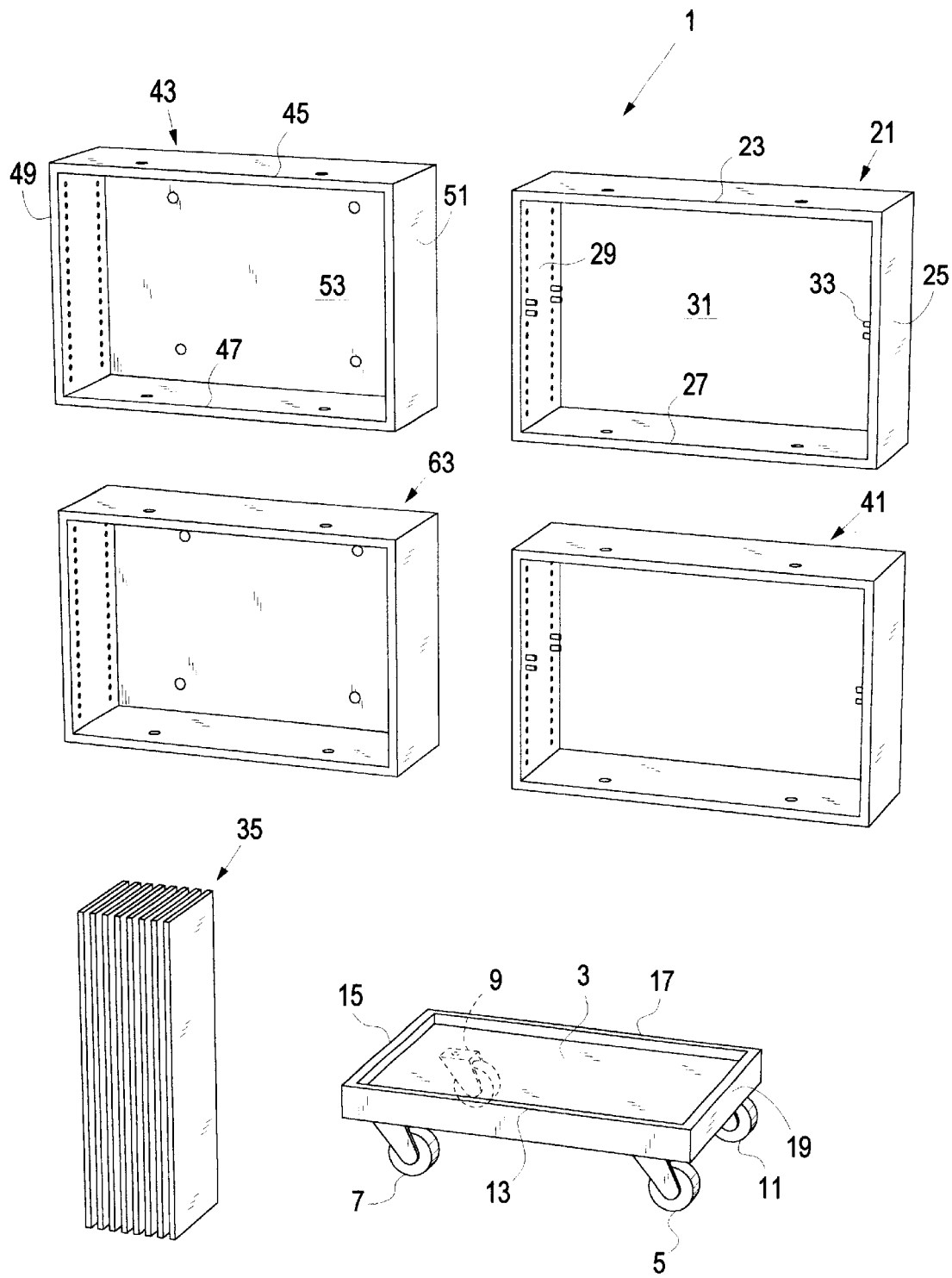
FIG. 1 shows a disassembled present invention modular moving cart embodiment utilizing one base member and two open-backed shelves and two closed-backed shelves; and, FIGS. 2 through 9 show different assemblies of the present invention cart of FIG. 1, illustrating the many varied uses available with the present invention cart.

FIG. 1 shows a modular container/bookshelf moving cart 1, which includes a rectangular base 3, which has a plurality of wheels, in this case four caster wheels 5, 7, 9 and 11. The base 3 also has four upwardly extending or projecting edges 13, 15, 17 and 19. This base 3 may be square or rectangular and should have dimensions compatible with nesting of the shelves. In other words, the edges should accommodate the shelves so as to fit efficiently therein. Preferably, these dimensions are approximately double or triple the width of a shelf by some multiple of the depth of a shelf. For example, if a shelf is 36 inches wide and 18 inches deep, then the base inside dimensions may be 72 inches by 36 inches, or 36 inches by 36 inches.

There are two open back bookshelf storage units 21 and 41, as shown. Referring specifically to bookshelf storage unit 21, there is a top 23, a bottom 27, and sides 25 and 29. The front and back are open and create passthrough area 31.

Shelf supports such as support 33 are also provided, and may be removable, adjustable and even recessable. Shelves, such as shelf 35, are optionally included and are usually included, but may not be needed in some moves, e. g. where only boxed or larger items are being moved.

Two closed back bookshelf storage units 43 and 63 are also included, and have solid backs. Referring to unit 43, there is shown top 45, bottom 47, sides 49 and 51 and back 53. Back 53 is a full back, but it could be a half back or support board(s) instead. Shelf 63 is the same as shelf 43, but could be different. Both have adjustable shelf supports. All four units shown in FIG. 1 could nave means for attaching the to one another and/or the base.

With respect to FIGS. 2 through 9, the components illustrated therein are identical to those shown in FIG. 1, and are therefore, identically numbered. Hence, they need not be and are not reidentified below.

Figure 2:
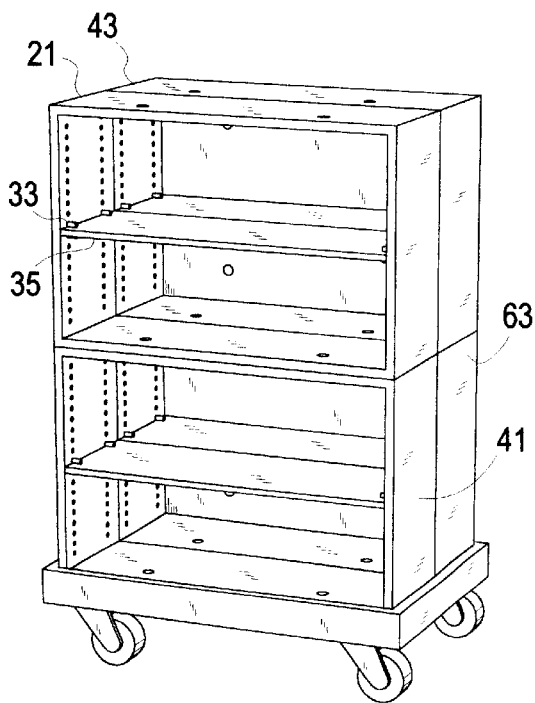

FIG. 2 shows the FIG. 1 present invention in a useful mode wherein units 43 and 63 with backs are stacked atop one another and with their backs against an rdge of base 3. Open units 21 and 41 are stacked atop one another and are positioned on base 3 in front of units 43 and 63. They are affixed or attached to one another by any known means, such as with straps, latches or bunkles or the like. Shelves are inserted as desired and two shelves on the same level create double depth shelves so that large office items such as computers and typewriters may be placed thereon and moved. An optional cover, rigid or flexible, such as canvass, could be atthached to the front or strapped theron.

Figure 3:
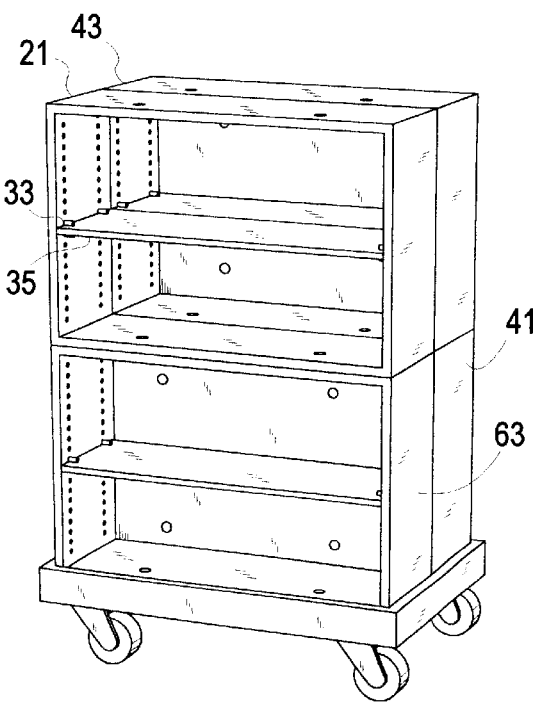

FIG. 3 shows the FIG. 1 present invention in a useful mode wherein the backed units 43 and 63 are stacked and arranged with their backs at the center of base 3 and open units are stacked in front of them. This creates four separate bookcases with multiple shelves, movable on base 3, to accommodate removal and transport of bookcase content for storing and moving.

Figure 4:
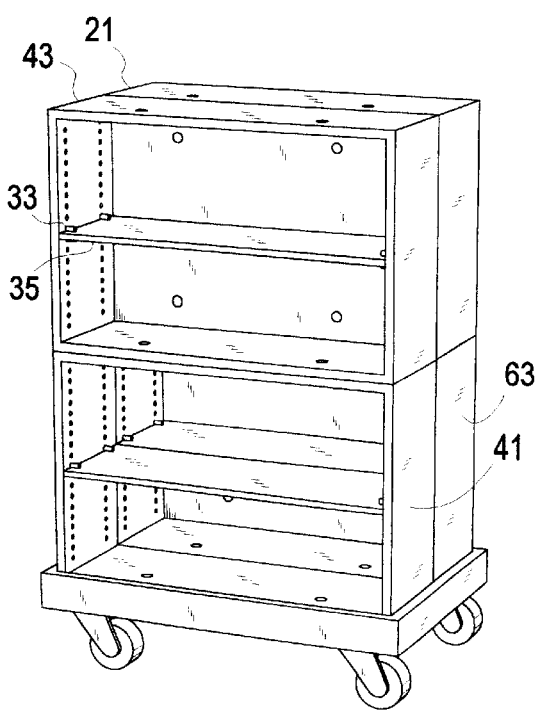

FIG. 4 shows the FIG. 1 present invention in a useful mode wherein the bottom units 41 and 63 are arranged as they are in FIG. 2, and the top units 23 and 43 are positioned as in FIG. 3, to provide a combination of different depth shelves.

Figure 5:
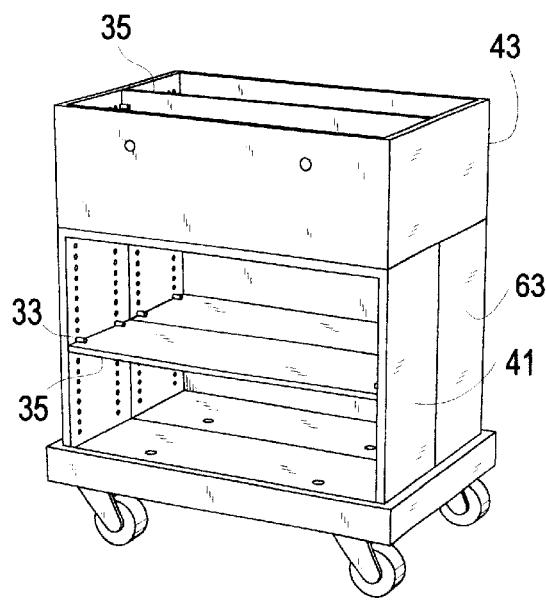

FIG. 5 shows the FIG. 1 present invention in a useful mode wherein open unit 41 and backed unit 63 are arranged in the lower level nested in base 3, as in FIG. 2, with deep shelf space, and unit 43 is stacked atop both of them in a laid down position wherein the shelves are in vertical positions, as shown. Thus, the lower arrangement is used for deep shelf purposes and the upper arrangement performs as box storage with division. Additional units may be atacked atop unit 43 to provide mare volume, as needed.

Figure 6:
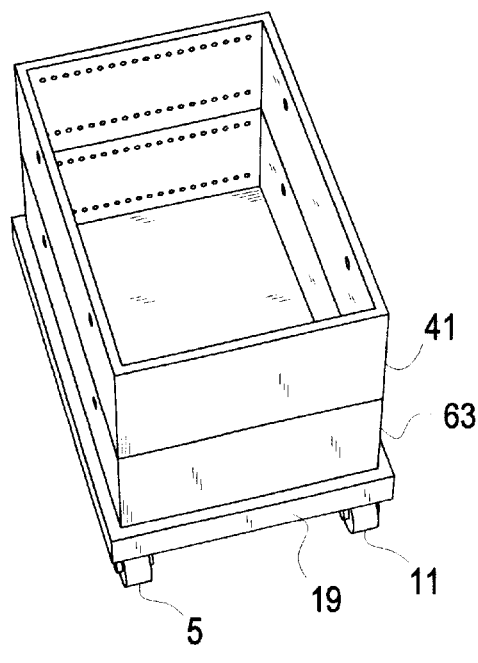

FIG. 6 shows the FIG. 1 present invention in a useful mode wherein a large bin is created by stacking two units, the top being open, the bottom being open or close backed, as shown.

Figure 7:
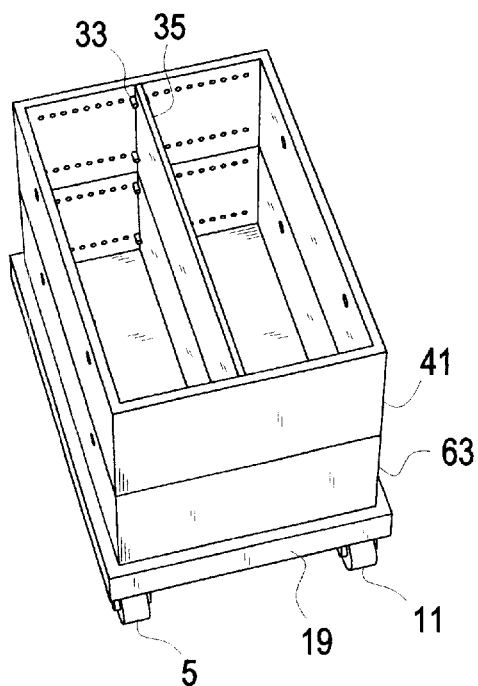

FIG. 7 shows the FIG. 1 present invention in a useful mode wherein the configuration is the same as in FIG. 6, but with vertical shelving to create division.

Figure 8:
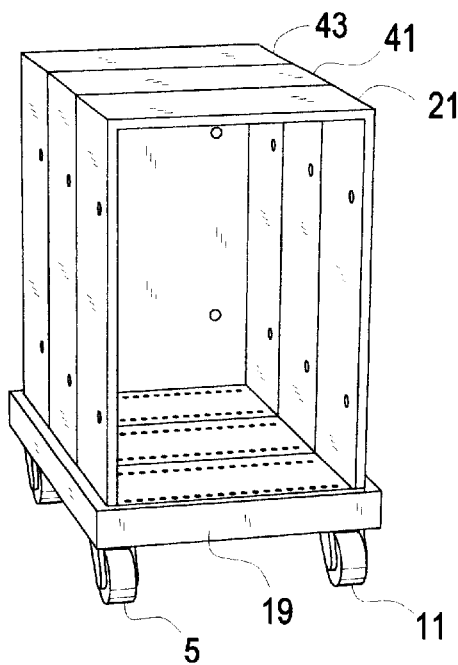

FIG. 8 shows the FIG. 1 present invention in a useful mode wherein two open units 21 and 41 are nested onside with closed unit 43 positioned therebehind with its back against an edge to create a deep, open front bin.

Figure 9:
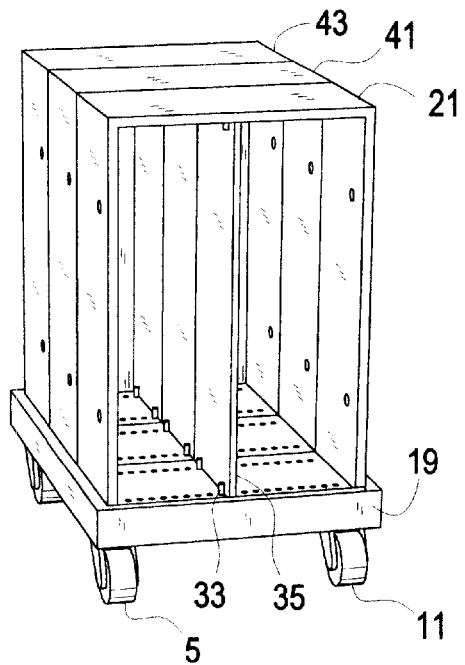

FIG. 9 shows the FIG. 1 present invention in a useful mode wherein the arrangement of the shelves and base are the same as shown in FIG. 8 except that shelves such as shelf 33 are inserted vertically to create separate, divided storage areas, for moving items such as large paintings or mirrors.

Obviously, numerous modifications and variations of the present invention are possible in light of the above teachings. It is therefore understood that within the scope of the appended claims, the invention may be practiced otherwise than as specifically described herein.

What is claimed is:

1. A Modular Container/Bookshelf Moving Cart, which comprises:
   (a) a rectangular base member having four outer edges adapted to support and retain a plurality of shelf storage units, said rectangular base member having a predetermined width, a predetermined length and a predetermined area based on said width multiplied by said length, said rectangular base member having a plurality of wheels attached thereto for movement of said rectangular base member;
   (b) a first shelf storage unit, having a top, a bottom, and two opposing vertical side walls situated perpendicularly to said top and said bottom, said first shelf storage unit having an open front and an open back, said first shelf storage unit being removably attachable to said rectangular base member, and, when in a first position, being a vertical placement position, extending vertically from said rectangular base member with said top facing upwardly away from said rectangular base member, and when in a second position, being a horizontal position, extending horizontally relative to said rectangular base member with said top being vertically positioned, said first shelf storage unit further containing at least one set of shelf-retaining members located therein for retaining at least one removable shelf in a preselected position therein;
   (c) a second shelf storage unit, having a top, a bottom, two opposing vertical side walls, a back wall and an open front, said second shelf storage unit being removably attachable to said rectangular base member, said second shelf storage unit having a first vertical placement position and a second vertical placement position, and having at least one horizontal placement position, said second shelf storage unit, when in its first vertical placement position, extending vertically from said rectangular base member with said back wall being positioned away from said outer edges, and, when in its second vertical placement position, extending vertically from said rectangular base member with said back wall being positioned adjacent one of said outer edges, and, when in its at least one horizontal placement position, extending horizontally relative to said rectangular base member and positionable below said first shelf storage unit when in its horizontal placement position, said second shelf storage unit further containing at least one set of shelf-retaining members located therein for retaining at least one removable shelf in a preselected position therein; and, further,
      wherein when said second shelf storage unit is in said first vertical placement position, said back wall is inwardly displaced upon said base adjoining said first shelf storage unit thereby establishing an interior dividing wall and establishing a dual open sided modular moving cart, and
      wherein when said second shelf storage unit is in said second vertical placement position, said back wall is located proximate to at least one outer edge of said base, thereby establishing a rear wall and further establishing a single open sided, deep modular moving cart, and,
      wherein when said second shelf storage unit is in said horizontal placement position, said back wall is horizontally nesting on said rectangular base member, and, with or without said first shelf storage unit, further establishing a container.

2. The modular container/bookshelf moving cart according to claim 1 wherein said side walls of said first shelf storage unit have a predetermined weight approximately equal to 1/n times at least one of the predetermined width and the predetermined length of said rectangular base member, wherein n is an integer from one to six, so as to accommodate sideways nesting of n number of first shelf storage units on said rectangular base member.

3. The modular container/bookshelf moving cart according to claim 1 wherein said side walls of said second shelf storage unit have a predetermined weight approximately equal to 1/n times at least one of the predetermined width and predetermined length of said base member, wherein n is an integer from one to six, so as to accommodate sideways nesting of n number of second shelf storage units on said rectangular base member.

4. The modular container/bookshelf moving cart according to claim 1 wherein when said second shelf storage unit is in said first vertical placement position, said vertically extended back side wall is centrally displaced upon said base adjoining said first shelf storage, unit thereby establishing a central dividing wall and establishing a dual open sided modular moving cart, and wherein when said second shelf storage unit is in said second vertical placement position, said vertically extended back side wall is located proximate to one of said outer edges of said base thereby establishing a rear wall and further establishing a single open sided modular moving cart.

5. The modular container/bookshelf moving cart according to claim 1 wherein when said second shelf storage unit is in said first placement position said first and second shelf storage units each contain at least one separate shelf therein, and wherein said shelves are horizontally displaced.

6. The modular container/bookshelf moving cart according to claim 1 wherein when said second shelf storage unit is in said second placement position said first and second shelf storage units each contain at least one extended shelf therein, said shelf extending fully from said open front of said first shelf storage unit to said vertically extended back sidewall of said second shelf storage unit.

7. The modular container/bookshelf moving cart according to claim 1 which further includes at least one removable vertical dividing wall.

8. The modular container/bookshelf moving cart according to claim 1 which further includes cover means for securing cargo within said modular container/bookshelf moving cart and wherein at least one of said first and second shelf storage units includes at least one handle.

9. The modular container/bookshelf moving cart according to claim 1 wherein at least one of said first and said second shelf storage units includes a hinged top.

10. The modular container/bookshelf moving cart according to claim 1 wherein said rectangular base member includes means defined therein for storing shelving.

11. The modular container/bookshelf moving cart according to claim 1 wherein said outer edges are upwardly projecting edges adapted to prevent movement of shelf storage units positioned thereon.

12. The modular container/bookshelf moving cart according to claim 1 wherein said second shelf storage unit is divided into an upper and a lower section whereby said back wall is defined by an upper and lower segment, wherein when both of said upper and lower sections of said second shelf storage unit are in said first vertical placement position, said vertically extended back side wall upper and lower segments are inwardly displaced upon said base adjoining said first shelf storage unit thereby establishing an interior dividing wall and establishing a dual open sided modular moving cart, and wherein when both of said upper and lower sections of said second shelf storage unit are in said second placement position, said vertically extended back side wall upper and lower segments are located proximate to one of said outer edges of said base thereby establishing a rear wall and further establishing a single open sided modular moving cart, and wherein when one of said upper and lower sections of said second shelf storage unit is in said first placement position and the other of said upper and lower sections of said second shelf storage unit is in said second placement position, said vertically extended back side wall is divided, and wherein one of said upper and lower segments is located in said first inwardly displaced position upon said base adjoining said first shelf storage unit thereby establishing an interior partial vertically extended dividing wall and wherein the other of said upper and lower segment is located in said second outwardly displaced position upon said base establishing a separate partial vertically extended rear wall.

13. The modular shelf moving cart according to claim 1 wherein said modular moving cart includes linking means for linking said modular shelf moving cart with another of said modular shelf moving carts.

14. The modular shelf moving cart according to claim 1 wherein when said second shelf storage unit is in said first placement position aid first and second shelf storage units each comprise at least 2 separate shelves therein.

15. The modular shelf moving cart according to claim 14 wherein each of said shelves is horizontally established with an angular slope.

16. The modular shelf moving cart according to claim 14 wherein at least one of said shelves extends horizontally and at least one other said shelf is sloped and extends non-parallel to said horizontally extended shelf.

17. The modular shelf moving cart according to claim 1 wherein said modular shelf moving cart comprises a rectangular cubical shape.

18. The modular shelf moving cart according to claim 1 wherein said modular shelf moving cart includes no shelving.

19. The modular shelf moving cart according to claim 1 wherein said base includes a raised lip which extends upwardly from said outer edges and includes a flat upper surface area defined inside said raised lip.

20. The modular shelf moving cart according to claim 1 wherein said base includes a raised lip which extends upwardly from said outer edges and includes a flat upper surface area defined inside said raised lip.

* * * * *